(12) United States Patent
Stagliano, Jr. et al.

(10) Patent No.: US 7,750,573 B2
(45) Date of Patent: *Jul. 6, 2010

(54) METHOD AND APPARATUS FOR AUTOMATIC HIGH POWER TUBE RECOVERY

(75) Inventors: James J. Stagliano, Jr., Daleville, AL (US); James Larry Alford, Enterprise, AL (US); James Rogers Helvin, Enterprise, AL (US); Dean A. Nelson, Enterprise, AL (US); Ron Killpack, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 1028 days.

This patent is subject to a terminal disclaimer.

(21) Appl. No.: 11/485,010

(22) Filed: Jul. 12, 2006

(65) Prior Publication Data

US 2008/0012656 A1 Jan. 17, 2008

(51) Int. Cl.
*H01J 25/50* (2006.01)
(52) U.S. Cl. ............... 315/39.63; 315/39.51
(58) Field of Classification Search ............ 315/39.3, 315/39.51, 39.55, 7, 34, 35; 330/4.6, 4.7, 330/85, 87, 88
See application file for complete search history.

(56) References Cited

U.S. PATENT DOCUMENTS

| | | | |
|---|---|---|---|
| 4,684,951 A | 8/1987 | Baumer | 342/362 |
| 4,868,917 A | 9/1989 | Woolcock | 342/26 |
| 4,940,987 A * | 7/1990 | Frederick | 342/26 D |
| 5,500,646 A | 3/1996 | Zrnic | 342/188 |
| 5,621,410 A | 4/1997 | Gray et al. | 342/26 |
| 5,726,657 A | 3/1998 | Pergande et al. | 342/202 |
| 5,793,334 A | 8/1998 | Anderson et al. | 343/786 |
| 5,940,776 A | 8/1999 | Baron et al. | 702/4 |
| 6,061,013 A | 5/2000 | Sauvageot et al. | 342/26 |
| 6,473,026 B1 | 10/2002 | Ali-Mehenni et al. | 342/26 |
| 6,803,875 B1 | 10/2004 | Alford et al. | 342/26 |
| 6,859,163 B2 | 2/2005 | Alford et al. | 342/26 |
| 7,049,997 B2 | 5/2006 | Alford et al. | 342/26 |
| 7,307,583 B1 * | 12/2007 | Woodell et al. | 342/173 |
| 7,369,082 B2 * | 5/2008 | Stagliano et al. | 342/26 R |
| 7,551,123 B2 * | 6/2009 | Stagliano et al. | 342/188 |
| 7,583,222 B2 * | 9/2009 | O'Hora et al. | 342/26 R |

(Continued)

OTHER PUBLICATIONS

Doviak, R.J., Bringi, A. Ryzhkov, A. Zahrai, D.S. Zrnic. "Considerations for Polarimetric Upgrades to Operational WSR-88D Radars." Journal of Atmospheric and Oceanic Technology, Mar. 2000, vol. 17, pp. 257-278.

(Continued)

*Primary Examiner*—Douglas W Owens
*Assistant Examiner*—Minh D A
(74) *Attorney, Agent, or Firm*—Russell Carter Gache Maynard Cooper & Gale, PC (57) ABSTRACT

The invention consists, generally, of a method for automatically reducing power to an electron emitting cathode by sensing an operating condition of the electron emitting cathode, calculating a condition number based upon the operating condition, comparing the condition number to a threshold value, and reducing the power to the electron emitting cathode when the condition number is greater than the threshold. The apparatus and method may be implemented upon a system having a high voltage power source, an RF tube, a control processor, and a signal processor.

26 Claims, 3 Drawing Sheets

U.S. PATENT DOCUMENTS 7,589,666 B2 * 9/2009 Passarelli et al. ............ 342/196

OTHER PUBLICATIONS

Liu, Y., J.W. Conway, E.A. Brandes, A.V. Rzyhkov, J. Vivekanandan, D.S. Zrnic, and R. Oye. "The Use of Polarization Data in the Operational Identification of Hydromeoter and Non-hydrometeor Targets." Preprints, 29th Conf. Radar Meteor. Montreal, Canada: American Meteorological Society 1999: pp. 178-179.

Ryzhkov A., R. Lopez, R. Fulton, D. Zrnic, T. Schuur and Y. Liu. "Hydrometeor Classification with a Polarimetric Radar for Improved Rainfall Measurements and Detection of Hail and Electrically Charged Regions." Preprints, 29th Conference on Radar Meteorology. Montreal, Canada: American Meteorological Society, 1999: pp. 289-292.

Skolnik, Merrill I. "Introduction to Radar Systems." New York: 3rd ed 2001.

Vivekanandan, J., D.S. Zrnic, S.M. Ellis, R. Oye, A.V. Ryzhkov, and J. Straka "Cloud Microphysics Retrieval Using S-band Dual-polarization Radar Measurements." Bulletin of the American Meteorological Society 1999: pp. 381-388.

Zahrai Allen and Dr. Dusan Zrnic. "Implementation of Polarimetric Capability for the WSR-88D (NEXRAD) Radar." Long Beach, CA. American Meteorological Society 1997.

Zrnic, D.S., and A.V. Ryzhkov. "Polarimetry for Weather Surveillance Radars." Bulletin of the American Meteorological Society 1999: pp. 389-406.

* cited by examiner

METHOD AND APPARATUS FOR AUTOMATIC HIGH POWER TUBE RECOVERY

FIELD OF INVENTION

The present invention relates to electron emitting devices, and more particularly, to an electron emitting cathode that operates in a radar system.

BACKGROUND OF INVENTION

Electron emitting cathodes are used in a variety of devices such as communication and radar systems for amplifying radio frequency (RF) or microwave electromagnetic signals. For example, an electron emitting cathode may be used within a traveling wave tube (TWT), klystron, or other microwave device. Electrons originating from the electron emitting cathode are focused into a beam propagated through a tunnel or a drift tube generally containing an RF interaction structure. An RF wave is made to propagate through the interaction structure so that it can interact with the electron beam that gives up energy to the propagating RF wave. Thus, the device may be used as an amplifier for increasing the power of a microwave signal.

The electron emitting cathode may include some form of heater, such as an internal heater disposed below the cathode surface, that raises the temperature of the cathode surface to a level sufficient for thermionic electron emission to occur. Alternatively, the cathode may be made to produce electrons without the aid of a heater, such as for a cold-cathode gas tube where the electrons are produced by bombardment of the cathode by ions and/or by the action of a localized high electric field. When the voltage potential of an anode spaced from the cathode is made positive with respect to the cathode, electrons are drawn from the cathode surface and caused to move toward the anode. A significant energy level signal is transmitted through this cathode in order to accelerate the electrons necessary to produce the high power RF output. Each time this occurs more and more electrons are boiled off the cathode. Eventually, the cathode reaches a state where the surface is depleted. Plasma density within the tube may also increase, resulting in high energy electrical discharge (arc) conditions and ultimately failure of the tubes.

When producing RF signals, some users avoid these depletion and high plasma density conditions by operating below the specifications of the equipment. Such a method reduces the capability of the system by creating RF signals of lower power, yet the method does extend the life of the electron emitting cathode and tube and reduces maintenance costs. Other methods continuously operate the tube at full specifications and may see failures in months rather than years, inducing tens or hundreds of thousands of dollars in maintenance costs for the system.

SUMMARY OF THE INVENTION

The invention consists, generally, of a method for automatically reducing power to an electron emitting cathode by sensing an operating condition of the electron emitting cathode, calculating a condition number based upon the operating condition, comparing the condition number to a threshold value, and reducing the power to the electron emitting cathode when the condition number is greater than the threshold.

DESCRIPTION OF THE PREFERRED EMBODIMENTS

Figure 1:
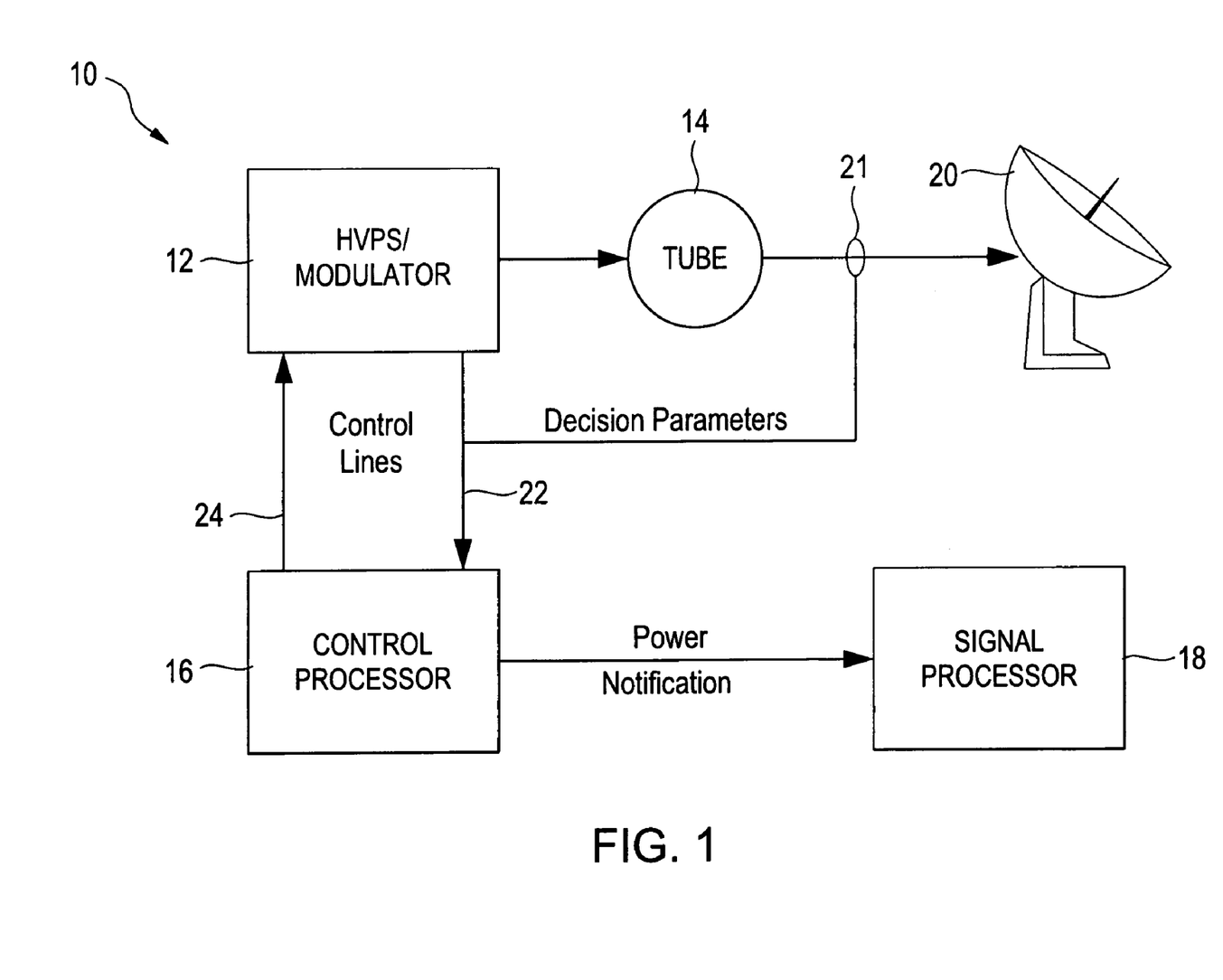
FIG. 1 shows a block diagram of the invention within a radar system.

Turning now to the drawing figures, FIG. 1 is a block diagram of components of a radar system 10 incorporating the invention. The radar system 10 includes a high voltage power source 12, an RF tube 14, a control processor 16, and a signal processor 18. The control processor 16 controls the high voltage power source 12 and sends signals to the signal processor 18 to notify a user of the system 10 of the performance of the system 10. The RF tube 14 generates an RF signal 15 to send to an antenna 20 based upon the amplitude of the signal from the high voltage power source 12. A coupler 21 samples the signal from the tube 14 prior to propagation. By controlling the amplitude of the high voltage power source 12, the amount of energy in the tube 14 is controlled such that lower amplitudes in the high power voltage source 12 generate lower energy levels in the tube 14, and thus lessen the rate of depletion of the cathode and the buildup of plasma.

The control processor 16 determines the amplitude of the voltage signal from the high power voltage source 12. The control processor 16 receives decision parameter signals 22 from the high power voltage source 12 and/or the coupler 21 and calculates whether the amplitude of the signal from the high power voltage source 12 should be adjusted. If the signal should be adjusted, then the control processor 16 sends a control signal 24 to the high power voltage source 12 to modulate the high power voltage source 12. The control processor 16 also sends a power level notification signal 26 to the signal processor 18 so that the signal processor 18 may calculate atmospheric conditions by comparing a received signal at the antenna 20 to the signal sent from the tube 14.

In a preferred embodiment, the high power voltage source 12 is a DC power device that provides power to the tube 14 for exciting the electrons at the cathode and to other elements that help control the electrons in the tube 14. For example, the high power voltage source 12 may provide the power to generate an EM field in the tube 14 for containing the electrons, to cool the collector in the tube 14, and/or generally operate the tube 14. A measure of the efficiency of the tube, known as the RF power conversion efficiency, is the ratio of the power of the transmitted RF signal to the power used to excite the electrons at the cathode. This ratio normally ranges from 10% to 60% at full power. Another ratio, known as the transmitter system efficiency, is the ratio of the transmitted RF signal to the power from the high power voltage source 12. The transmitter system efficiency, normally, is around half the RF power conversion efficiency when operating at full power. Thus, around half of the power from the high power voltage source 12 may be used to power devices within the system 10.

At maximum efficiency, most tubes 14 operate saturated, i.e., completely on or completely off. There are no intermediate power levels associated with the operation of the device. However, operation at saturation maximizes the rate of depletion of the cathode and the plasma density inside of the tube 14. Thus, in order to manage the balance between depletion, plasma density, and power usage (and particularly power waste from drops in efficiency), the control processor 16 applies logic to the operating parameters of the tube 14 to set the signal of the high power voltage source 12 at a level that modulates the signal in the tube 14 so that the operating conditions are managed, as discussed below with reference to FIG. 2.

The tube 14 is an RF power source which converts an electron stream into an RF frequency by either generating a RF wave or amplifying an RF input wave. Preferably, the tube 14 is either a klystron, a traveling wave tube, or a magnetron. The tube 14, however, may be any power amplifier or power oscillator. The choice of the type of tube 14 may depend on the application, the constraints of the system in which the tube 14 is to be used, cost, and/or availability.

Generally, the tube 14 includes an electron source (i.e., electron gun), an RF interaction portion, and a collector. The high power voltage source 12 provides a power source to the electron gun which heats the cathode and focuses the emission of electrons from the cathode into an electron beam. The electron beam travels along the length of the RF section where it interacts with an RF signal to amplify the signal. After the amplified RF signal is collected from the RF interaction portion of the tube 14, the collector absorbs the remaining electrons dissipating the energy that remains in the tube. The collector may be a single collector, or may cascade a number of collectors in stages to increase the efficiency of the collectors by using collectors at intermediate voltages which may then absorb the electrons at voltages near optimum.

The most common sources of RF tubes 14 include klystrons, traveling wave tubes ("TWT"), and magnetrons. Which type of RF tube 14 should be used may be application specific as these RF tubes 14 have some similarities and differences that make them more amenable to certain applications. Each of these types of devices are slow wave devices. The phase velocity of the EM wave in the RF structure is slowed to a velocity approximately equivalent to the speed of the electron beam. In this manner, the DC energy in the electron beam may maximally couple to the RF signal and efficiently transfer energy to the RF signal. However, the energy transfer is not complete, which is why collectors must harness energy at the end of the tubes.

A klystron creates interaction between the RF signal and the electron beam at interaction gaps in the wall of the collector anode. At the interaction gaps, RF cavities are coupled to the anode. An RF signal input into a first RF cavity is amplified at the first interaction gap and travels to the adjacent interaction gap across the drift space. In the final RF cavity along the anode, the amplified RF signal is coupled to a waveguide or other RF transmission line and passed to the antenna 20.

Depending when an electron passes the interaction gap, the electron may be accelerated or decelerated. If an electron passes the interaction gap when the RF signal is at a peak value, the electrons are accelerated. Conversely, when an electron passes the RF signal at a minimum value, the electron are decelerated. An accelerated electron may catch a slowed electron and "bunch" electrons so that the electron beam becomes density modulated. As the electron beam continues down the path, the bunching becomes greater as additional interaction gaps are crossed. At the output RF cavity, the bunching is maximum and the gain in the RF signal is realized. The klystron, then, has a high gain and good efficiency in that it maximizes transfer from the electron beam. The klystron may also have higher average and peak powers relative to other RF tubes. The bandwidth for a klystron, though, may not be as large as desired, and particularly may not be as wide as desired at lower power levels.

A TWT has a relatively large bandwidth, but generally has less gain and less efficiency than a klystron. As the power level increases in a TWT, the bandwidth decreases, but still may be a relatively wide bandwidth. The TWT is similar in operation to the klystron, but differs from a klystron in that the interaction between the RF wave and the electron beam is continuous over the length of the RF interaction portion of the tube while the interaction in the klystron occurs only at the interaction gaps. In order for the interaction to be continuous, a slow wave structure along the length of the RF interaction portion is used. In cases where the broadest bandwidth is achieved, a helical slow wave structure is used. Other slow wave structures, such as the ring-bar circuit or coupled-cavity circuits like a cloverleaf, may be used for higher power applications, but may not have as wide a bandwidth as the helical slow wave structure. Other power amplifiers are generally similar in structure to the klystron and TWT, while power oscillators, such as a magnetron, use different structures to create the RF signal for transmission.

A magnetron is a compact and efficient power oscillator that may be used as the tube 14 in the system 10. The magnetron uses a circular configuration where the cathode is centrally located. Vanes extending radially away from the cathode define walls of resonant cavities and attach to the inside wall of the anode. As the electrons are excited at the cathode and flow outward, interaction between the electrons and the RF wave in the resonant cavities occurs. The RF field extends outward through coupling slots in the wall of a cylindrical anode centered around the cathode and enter a coaxial cavity. A coupling slot on the outer wall of the coaxial cavity couples to an output waveguide, which is the output of the magnetron. While the structure and application of RF tubes 14 differs, the properties of each structure are known and analysis of the signal of the high power voltage source 12 may be specific to the type of RF tube 14 used in the application.

Signal processor 18 receives power level notification signal 26 from the control processor 16. The power level notification signal 26 allows the signal processor 18 to properly analyze the received signal. The power level notification signal 26 includes the operating power condition of the transmitted signal. The signal processor 18 may then adjust the calibration curve so that proper analysis may occur.

Figure 2:
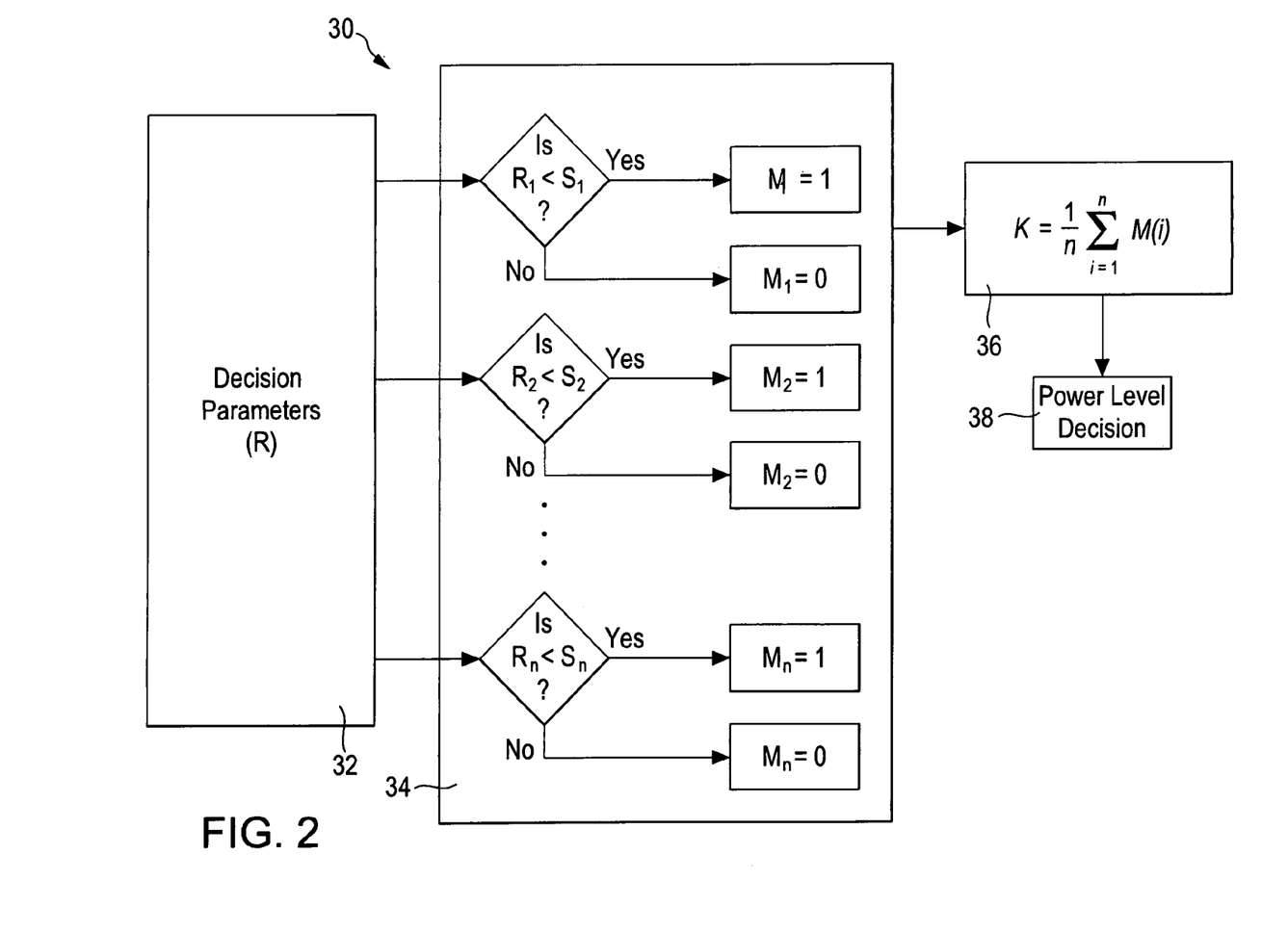
FIG. 2 shows a block diagram decision algorithm utilized by the invention.

Turning now to FIG. 2, FIG. 2 shows a block diagram of a decision algorithm 30. The decision algorithm compares a set of decision parameters 32 to a set of user defined characteristics. The set of decision parameters 32 are passed to a set of parallel comparators 34 where the set of decision parameters are compared to the set of user defined characteristics. A summing block 36 sums the output of the comparators 34. The summed output is passed to a power level decision block 38, which determines the power level.

The set 32, which is denoted by R, is the set of conditions measured by sensors within the high voltage power supply 12 and tube 14. These sensors provide information concerning high energy discharge events within the high power tube 14. Depending on the type of RF tube 14, different sensors may be used and may measure different characteristics of the high power voltage source 12 and the RF tube 14. For example, the sensors may sense the number of arc events that have occurred in the tube 14. Other conditions, such as the average number of arc events in a given time, and the number of arc events in a specified unit of time. Other conditions such as the average VSWR, change in the average VSWR over time, or amount of change in the VSWR in a given time unit may also be conditions passed from the sensors for inclusion in the set 32.

Each of the sensors sends a signal through the decision parameters signal 22 to the control processor 16 so that the control processor 16 may calculate the power level according to the output of the summing block 36 after the comparators 34 compare the sensor signals 32 to the set of user defined characteristics. The individual elements of the set R may include one sensor signal or may be combinations of sensor signals according to the type of condition the element of the set R is sampling.

The set of user defined sensor threshold condition characteristics, denoted by S, defines a user specified level for each of the values for the sensor. The set may be defined based on the type of sensor, the output range of the sensors, the sensitivity of the sensors to conditions in the system 10, and the probability of failure based upon the sensor signal. Many of these characteristics may be defined by the type of RF tube 14 is used and may be set by the type of RF tube 14. Other characteristics may be based on the user's comfort level with the system 10 and the ability of the user to predict faults within the system 10. Each sensor signal in the set R corresponds to one condition characteristic in the set S, so that the comparators 34 are comparing like terms.

The comparators 34 receive a single value from the set R and balance that value against the similar user defined sensor threshold value in the set S (not shown). If the value from R is greater than the value from S, then the comparator 34 outputs a threshold indicia of 1. If the value from R is less than the value from S, then the comparator 34 outputs a threshold indicia of 0. Thus, the output of any of the comparators 34 is a binary value, either a 0 or a 1.

The set of comparators 34 may include n number of comparators 34, where n is the number of sensors (or defined condition characteristics) in the system 10. The n comparators 34 generate a threshold indicia output vector, M, which includes n components, each component having a value of either 0 or 1. The output vector M is passed to the summing block 36. In an alternative embodiment, one comparator may be used to compare the elements in vector R to the elements in vector S.

Within the summing block 36, each of the values in the output vector M is summed and divided by the number of sensors, n. The output of the summing block 36, K, is a scalar measure of the number of condition characteristics that are greater than the defined condition characteristics. The summing block output K varies from a value of zero to a value of one, and may generally be considered a measure of the percentage of conditions that exceed the defined conditions. As the percentage increases, the likelihood of degradation within the tube 14 increases.

The scalar K is passed to the power level decision block 38. The power level decision block 38, as will be described further in FIG. 3, determines the power level of high power voltage source 12 which, in turn, sets the stress level on the tube 14. At some predefined threshold level, the output K becomes greater than the threshold, and the system reduces power to the tube 14. The relationship between the scalar K and the threshold defines when and how the power in the tube 14 is controlled.

In another embodiment of the decision algorithm 30, the output vector of the comparators M may be a scaled binary vector. The scaling process may occur within the comparators 34 individually, or in the summing block 36. If the scaling is done within the comparators 34, then individual entries in the vector M will be scaled prior to passing the output vector M to the summing block. The n components of the vector M may have values other than 0 or 1. The components would have values of either 0 or $A_i$ where $A_i$ is the scaling factor for the i condition characteristic with i varying from 1 to the number of conditions n. The summing block 36 then sums the vector M which may have many different values in it. The output K of the summing block may not be limited to values less than one, however, because higher scaling factors for some of the conditions could exceed a value of one. It may be beneficial to scale an individual condition with a higher scaling value than one when an individual condition increases the likelihood of a failure in the tube 14 relative to the likelihood of other individual conditions. Similarly, conditions that are less likely to cause tube fatigue may have scaling factors smaller than one to minimize the effects of that condition being over-amplified in the overall analysis of the tube 14.

While the scaling factors may be implemented at the comparators 34, the scaling factors may also be implemented in the summing block 36. When the scaling factors are incorporated at the point of the summing block 36, then the form of the summing equation is:

$$K = \frac{1}{n}\sum_{i=1}^{n} A_i M_i$$

The scaling factors A may be expressed as a vector having n components. Then, the output of the comparators would be similar to the comparators 34 of FIG. 2 in that the result of each comparator would be a value of zero or one. Whether the scaling occurs at the summing block 36 or the comparators 34, the scaling factors may be set by either the user or within the system 10 according to the type of components and sensors in the system 10. For example, a user may wish to change the scaling factor of a sensor that the user believes has higher predictive capabilities for degradation and, ultimately, failure of the tube 14.

In another embodiment of the algorithm, the output of the comparators 34 may vary from zero to one. In such an embodiment, an additional step of capturing the magnitude of the difference between the sensed condition and the defined condition characteristic would vary the output of the comparator between zero in one. In the simplest calculation, the output would vary linearly such that the output for a comparator 34 may equal the difference between the sensed condition and the defined condition characteristic divided by the defined condition characteristic plus an offset of 1. As the sensed value approaches the defined condition characteristic, the value from the comparator approaches 1. As the sensed value exceeds the defined condition characteristic, the output value exceeds one. In this manner, when a sensor senses an extraordinarily high value, the output of the comparator 34 varies the result high. Similarly, low values in the sensor vary the result low, preferably with a lower limit of zero. It may also be desirable to set an upper limit for any one comparator output to limit the possibility that a single sensor alone could trigger a power change by overwhelming the value of K over the value of the threshold. In other methods of varying the output of the comparators 34, the output may be varied parabolically, along a bell curve, or based on any other function that varies the output according to a need of a user or the system 10.

Figure 3:
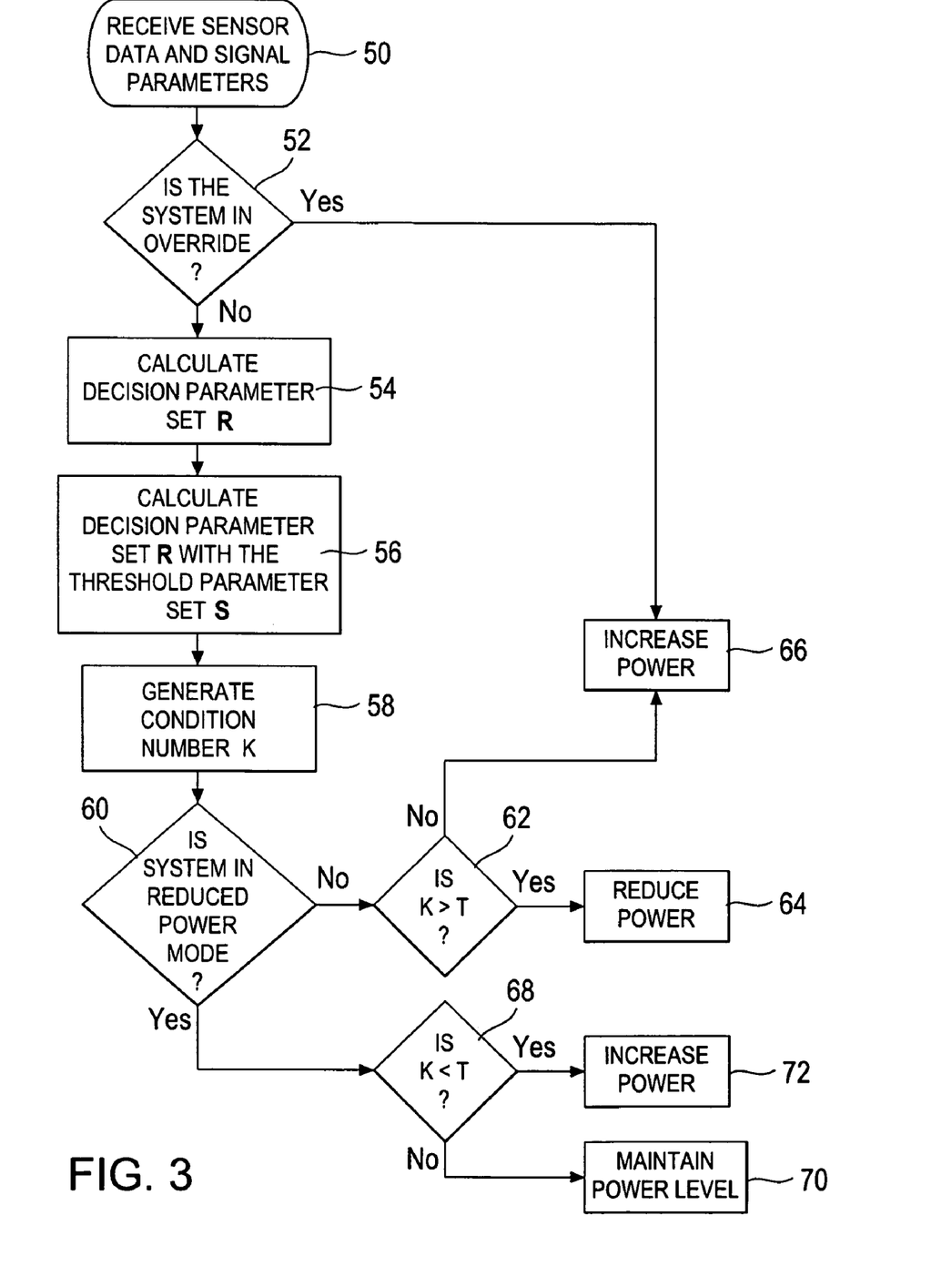
FIG. 3 is a flowchart showing process steps utilized in one embodiment of the invention.

Turning now to FIG. 3, FIG. 3 is a flowchart of steps in a component of FIG. 2 according to an embodiment of the invention. In step 50, sensor data and system parameters are received. A decision step 52 determines whether the system is in override. If the system is not in override, then the decision parameter set R 32 is calculated in step 54 and compared to the user defined conditions S in step 56. The summing block output K is calculated in step 58. A decision block 60 determines if the system is in reduced power mode. If the system is not in the reduced power mode, then decision block 62 compares the summing block output K to the threshold T. If the value of the result of the summing block K is greater than the threshold T, then power is reduced in step 64. If the value of the result of the summing block K is less than or equal to the threshold T, then the system remains at full power in step 66. If, in step 60, the system is already in reduced power, then decision block 68 compares the summing block output K to the threshold T. If the value of the result of the summing block K is greater than or equal to the threshold T, then the system remains at reduced power in step 70. If the value of the result of the summing block K is less than the threshold T, then power increases in step 72.

In step 52, if the system is in override, then the method maintains full power in step 66. Override may be necessary at times when the radar system must maintain full capability regardless of sensor output from the tube 14. Such a circumstance may exist when inclement weather is present, or expected. Thus, a user may specify the override condition to keep the steps used for determining poor operating conditions within the tube 14, and maintain full power regardless of operation. Override, however, makes the system more susceptible to a failure caused by the tube 14 failing.

Steps 54-58 of the method of FIG. 3 perform the calculations in the decision algorithm 30. The decision parameter set R is calculated from the sensor feedback received from the system 10. The sampling rates for different sensors and storage of information from the sensors may reside within the control processor 16. It may be beneficial to use rolling averages of sensor data such that data from the sensors may be sampled and kept in memory within the control processor 16. In this manner, multiple samples from a sensor may be averaged forming a rough approximation of a low pass filter. Other sensors may use single sample points for extraction of entries in the decision parameter set R. The method of FIG. 3 may repeat at any rate either defined by a user, at a default rate, or triggered by events within the system. For example, the rate at which the method repeats may be a function of the sampling speed of the sensors. It may be beneficial to limit the rate at which the method processes the data parameter set between the slowest rate at which a sensor is sampled and the fastest rate at which a sensor is sampled. If the method repeats at the fastest rate, then each time the fastest sensor refreshes its value, the method will process the decision parameter set R. If the method repeats at the slowest sensor rate, then each sensor will have sampled a new sample between calculations of the decision parameter set R.

Steps 60-72 of the method of FIG. 3 set the power level for the system 10. In the preferred embodiment of FIG. 3, the power level is set to one of two states. The system 10 performs at full power or reduced power. In the preferred embodiment, the reduced power is approximately 50% of standard maximum output. However, other power levels may suffice, and may be set by the user according to the system 10 of the user. Also, a user may set multiple states to drop the power level incrementally. For example, if the condition number K remains high a certain time after the power has been reduced, then the method may further reduce the power level. The further reduction may be as a percentage of the reduced power level, or as an absolute drop of power. In this manner, a user may define a stairstep method of reducing power to the system 10 to maintain the desired operation of the system 10.

In another embodiment, the threshold may change according to the current operating condition (i.e., power level) of the system 10. For example, if the system is in reduced power, then the threshold may be set lower than if the system was in full power. Then, the next time the method of FIG. 3 processed the data set and compared the condition number K to the threshold, the power level would be returned to full power only if the condition number was less than the lower threshold. By implementing the lower threshold when in reduced power mode, a hysteresis is established that gives the system 10 more time to operate at the lower power level which may help to prolong the life of the tube by providing greater recovery time within the tube at lower power levels. Once the condition number K drops below the lowered threshold and the system 10 returns to full power, then the threshold may also increase to its full value so that the system may run at full power until the conditions sensed by the sensors exceed the threshold number. In this embodiment, then, the power level does not rise and fall regularly as the condition number K varies incrementally around the threshold number. This same method of introducing hysteresis in the power level may also be implemented in the multi-state power level described above.

In another embodiment of the method of FIG. 3, the power level may also be set according to the difference between the condition number K and the threshold T. For example, the method may reduce power linearly with respect to the difference between the condition number K and the threshold T. In such a method, as the condition number K increases in size, the amount of power reduction increases. As the condition number returns to a normal operating condition, then the power level returns to maximum power. Mathematically, the power level may be represented as:

$$P_{cur} = P_{max} - C(K-T)$$

where $P_{cur}$ is the current operating power level, $P_{max}$ is the maximum power and C is a scaling factor representing the amount of power reduction for an incremental change in the condition number. In a linear system, C is a constant. Other scaling factors may be used to vary the change in power level other than linear. For example, the difference between the condition number and the threshold may be squared, or raised to some other power, in order to vary the power exponentially with respect to the difference between the condition number and the threshold.

The methods that adjust the power level may include other logical algorithms such as a fuzzy logic controller, a neural network controller, combinations of these controllers, or other I/O algorithms. In implementing the different controller algorithms, criteria such as stability, efficiency and noise should be considered.

While the invention has been shown in embodiments described herein, it will be obvious to those skilled in the art that the invention is not so limited but may be modified with various changes that are still within the spirit of the invention.

Having set forth the nature of the invention, what is claimed is:

1. A method of reducing power to an electron emitting cathode, comprising the steps of:
   a. sensing an operating condition of said electron emitting cathode by sampling a plurality of sensors;
   b. calculating a condition number based upon said operating condition, wherein said calculating step further comprises balancing said samples of said plurality of sensors against a plurality of sensor threshold values such that the number of said samples is equal to the number of said plurality of sensor threshold values;

c. comparing said condition number to a threshold value; and d. reducing power to said electron emitting cathode when said condition number differs from said threshold value by a predetermined amount.

2. The method of claim 1, further comprising balancing each of said samples of said plurality of sensors against a corresponding one of said plurality of said sensor threshold values.

3. The method of claim 2, wherein said balancing step further comprises incrementing said condition number by a unit value when the value of one of said samples of said plurality of sensors is greater than a corresponding value of one of said plurality of sensor threshold values.

4. The method of claim 2, wherein said balancing step further comprises incrementing said condition number by an amount proportional to the difference between the value of one of said samples of said plurality of sensors and a corresponding value of one of said plurality of sensor threshold values.

5. The method of claim 1 wherein said reducing step further comprises reducing the power to said electron emitting device to fifty percent of the maximum power of said electron emitting device.

6. The method of claim 5, further comprising the step of lowering said threshold after said reducing step.

7. The method of claim 6, further comprising the step of increasing the power to said electron emitting cathode when said condition number falls below said lowered threshold.

8. The method of claim 7, further comprising the step of returning said threshold to the original value of said threshold when said power is increased.

9. The method of claim 5, further comprising the step of further reducing the power to said electron emitting cathode when said condition number remains greater than said threshold.

10. The method of claim 1 wherein said reducing step further comprises reducing power by an amount proportional to the difference between said threshold and said condition number.

11. A system for controlling the power to an electron emitting cathode; comprising:

a. a plurality of sensors configured to sense operating conditions of said electron emitting cathode;

b. comparators configured to compare said operating conditions to a plurality of sensor threshold values and to output a threshold indicia, and wherein said comparators are further configured to increment said condition number by a unit value when the value of one of said operating conditions from said plurality of sensors is greater than a corresponding value of one of said plurality of sensor threshold values;

c. a summing block configured to sum said threshold indicia, said sum of said threshold indicia being a condition number; and d. a power level decision block configured to receive said condition number and to compare said condition number to a threshold value to determine a power level for said electron emitting cathode.

12. The system of claim 11 wherein said comparators are further configured to increment said condition number by an amount proportional to the difference between the value of one of said operating conditions of said plurality of sensors and a corresponding value of one of said plurality of sensor threshold values.

13. The system of claim 11, wherein said power level decision block is configured to reduce the power to said electron emitting device to fifty percent of the maximum power of said electron emitting device when said condition number is greater than said threshold.

14. The system of claim 13, wherein said power level decision block is further configured to lower said threshold when the power to said electron emitting device has been reduced.

15. The system of claim 14, wherein said power level decision block is further configured to increase the power to said electron emitting cathode when said condition number falls below said lowered threshold.

16. The system of claim 15, wherein said power level decision block is further configured to return said threshold to the original value of said threshold when said power is increased.

17. The system of claim 13, wherein said power level decision block is further configured to further reduce the power to said electron emitting cathode when said condition number remains greater than said threshold.

18. The system of claim 11 wherein said power level decision block is configured to set the power to said electron emitting cathode by an amount proportional to the difference between said threshold and said condition number.

19. A data structure for controlling the power to an electron emitting cathode, comprising:

a. a set of operating conditions;

b. a set of operating condition thresholds;

c. a comparator configured to compare said set of operating conditions to said operating condition thresholds, said comparator further configured to output a threshold indicia vector, and wherein said comparator is further configured to increment said condition number by a unit value when a value of one element of said set of operating conditions is greater than a corresponding value of one element of said set of operating condition thresholds;

d. a summing block configured to sum said threshold indicia vector, said sum being a condition number; and e. a power level decision block configured to receive said condition number and to compare said condition number to a threshold to determine a power level for said electron emitting cathode.

20. The structure of claim 19 wherein said comparators are further configured to increment said condition number by an amount proportional to the difference between a value of one element of said set of operating conditions and a corresponding value of one element of said set of operating condition thresholds.

21. The structure of claim 19, wherein said power level decision block is configured to reduce the power to said electron emitting device to fifty percent of the maximum power of said electron emitting device when said condition number is greater than said threshold.

22. The structure of claim 21, wherein said power level decision block is further configured to lower said threshold when the power to said electron emitting device has been reduced.

23. The structure of claim 22, wherein said power level decision block is further configured to increase the power to said electron emitting cathode when said condition number falls below said lowered threshold.

24. The structure of claim 23, wherein said power level decision block is further configured to return said threshold to the original value of said threshold when said power is increased.

25. The structure of claim 21, wherein said power level decision block is further configured to further reduce the power to said electron emitting cathode when said condition number remains greater than said threshold.

26. The structure of claim 19 wherein said power level decision block is configured to set the power to said electron emitting cathode by an amount proportional to the difference between said threshold and said condition number.

* * * * *